(12) United States Patent
Whinnery

(10) Patent No.: US 8,640,809 B2
(45) Date of Patent: Feb. 4, 2014

(54) FLYWHEEL ASSEMBLIES AND VEHICLES INCLUDING SAME

(75) Inventor: Joseph P. W. Whinnery, Marysville, OH (US)

(73) Assignee: Honda Motor Company, Ltd., Tokyo (JP)

( * ) Notice: Subject to any disclaimer, the term of this patent is extended or adjusted under 35 U.S.C. 154(b) by 55 days.

(21) Appl. No.: 12/984,167

(22) Filed: Jan. 4, 2011

(65) Prior Publication Data

US 2011/0163516 A1 Jul. 7, 2011

Related U.S. Application Data

(60) Provisional application No. 61/292,335, filed on Jan. 5, 2010.

(51) Int. Cl.
| | |
|---|---|
| *B62D 61/02* | (2006.01) |
| *B60R 21/13* | (2006.01) |
| *B62K 11/04* | (2006.01) |
| *B62D 49/08* | (2006.01) |

(52) U.S. Cl.
CPC ............... *B62K 11/04* (2013.01); *B62D 49/08* (2013.01)
USPC .......................................... 180/219; 280/755

(58) Field of Classification Search
USPC ................ 701/124; 280/268, 272, 755, 296; 180/219
See application file for complete search history.

(56) References Cited

U.S. PATENT DOCUMENTS

| | | | |
|---|---|---|---|
| 1,362,024 A * | 12/1920 | McKee | ......................... 180/219 |
| 2,247,749 A | 7/1941 | deVenel | |
| 2,472,944 A | 6/1949 | Furer et al. | |
| 2,829,467 A | 4/1958 | Pagano | |
| 3,124,007 A * | 3/1964 | Swinney | ......................... 74/5.22 |
| 3,232,635 A | 2/1966 | Drechsel | |
| 3,373,832 A * | 3/1968 | Summers | ....................... 180/226 |
| 3,511,454 A * | 5/1970 | Hamilton | ......................... 244/79 |
| 3,756,338 A | 9/1973 | Goodridge | |
| 3,787,066 A | 1/1974 | Hautier | |

(Continued)

FOREIGN PATENT DOCUMENTS

| | | |
|---|---|---|
| EP | 1955936 A1 | 8/2008 |
| EP | 1977964 A1 | 10/2008 |
| WO | 2007086176 A1 | 8/2007 |
| WO | 2011/115699 A1 | 9/2011 |

OTHER PUBLICATIONS

U.S. Appl. No. 61/314,540, entitled Regenerative-Powered Gyroscopic Stabilization Apparatus and Methods filed Mar. 16, 2010; Inventors: Kim et al.; 40 pages.

(Continued)

*Primary Examiner* — Anne Marie Boehler
*Assistant Examiner* — Maurice Williams
(74) *Attorney, Agent, or Firm* — Ulmer & Berne LLP

(57) ABSTRACT

A vehicle includes a frame, an engine, a steering assembly, a steerable wheel, a brake system, a flywheel assembly, and a controller. The frame defines a roll axis. The engine is supported by the frame. The steering assembly is pivotally coupled with the frame and is pivotable about a steering axis. The steerable wheel is rotatably coupled with the steering assembly. The flywheel assembly comprises at least one inertial mass and is coupled with the frame. A controller is coupled with the flywheel assembly and is configured to facilitate rotation of said at least one inertial mass.

22 Claims, 9 Drawing Sheets

(56) References Cited

U.S. PATENT DOCUMENTS

| | | | |
|---|---|---|---|
| 3,878,913 A | | 4/1975 | Lionts et al. |
| 3,881,736 A | | 5/1975 | Wilfert |
| 4,200,168 A | | 4/1980 | Moog |
| 4,531,605 A | | 7/1985 | Scholz et al. |
| 4,545,455 A | * | 10/1985 | Kanemura et al. ............ 180/197 |
| 4,625,985 A | | 12/1986 | Nakano et al. |
| 4,629,947 A | | 12/1986 | Hammerslag et al. |
| 4,691,798 A | | 9/1987 | Engelbach |
| 4,712,806 A | | 12/1987 | Patrin |
| 4,768,607 A | | 9/1988 | Molina |
| 4,779,485 A | | 10/1988 | Dollison et al. |
| 4,917,209 A | * | 4/1990 | Horiike et al. ................ 180/219 |
| 5,214,358 A | | 5/1993 | Marshall |
| 5,568,023 A | | 10/1996 | Grayer et al. |
| 5,684,244 A | | 11/1997 | Jones |
| 5,820,439 A | | 10/1998 | Hair, III |
| 5,823,281 A | | 10/1998 | Yamaguchi et al. |
| 5,960,900 A | | 10/1999 | Cheng |
| 6,040,634 A | | 3/2000 | Larguier |
| 6,042,449 A | * | 3/2000 | Ishimoto ....................... 446/234 |
| 6,098,584 A | | 8/2000 | Ahner et al. |
| 6,126,185 A | | 10/2000 | Kelley et al. |
| 6,360,838 B1 | | 3/2002 | Kulhavy |
| 6,370,475 B1 | | 4/2002 | Breed et al. |
| 6,382,338 B1 | | 5/2002 | Forbes |
| 6,476,529 B1 | | 11/2002 | Tilbor |
| 6,491,121 B2 | | 12/2002 | Morimoto et al. |
| 6,710,579 B2 | | 3/2004 | Ebel et al. |
| 6,918,467 B2 | | 7/2005 | Kasten |
| 7,006,901 B2 | | 2/2006 | Wang |
| 7,195,487 B2 | * | 3/2007 | Robbins .......................... 434/61 |
| 7,211,905 B1 | | 5/2007 | McDavid, Jr. |
| 7,296,663 B2 | | 11/2007 | Spina |
| 7,314,225 B2 | | 1/2008 | Murnen et al. |
| 7,350,787 B2 | | 4/2008 | Voss |
| 7,512,466 B2 | | 3/2009 | Hart et al. |
| 7,643,933 B2 | | 1/2010 | Hirata |
| 2003/0010554 A1 | | 1/2003 | Grong et al. |
| 2003/0146594 A1 | * | 8/2003 | Bunya et al. .................. 280/272 |
| 2004/0178009 A1 | | 9/2004 | Pavlykivskyj |
| 2005/0045398 A1 | | 3/2005 | Suzuki |
| 2007/0001423 A1 | | 1/2007 | Murnen et al. |
| 2007/0163828 A1 | | 7/2007 | Manganaro |
| 2008/0228357 A1 | * | 9/2008 | Hirata .............................. 701/46 |
| 2008/0249684 A1 | | 10/2008 | Hirata et al. |
| 2009/0200093 A1 | * | 8/2009 | Ren .............................. 180/65.1 |
| 2009/0254251 A1 | * | 10/2009 | Sato ................................. 701/41 |
| 2011/0231041 A1 | | 9/2011 | Kim et al. |
| 2011/0231060 A1 | | 9/2011 | Kim et al. |
| 2011/0231085 A1 | | 9/2011 | Kim et al. |

OTHER PUBLICATIONS

Brochure entitled: "HT-RSI High Motor Torque Momentum and Reaction Wheels 14-68 Nms with integrated Wheel Drive Electronics"; 2 pages; Rockwell Collins Deutschland GmbH, Germany; retrieved from www.electronicnote.com/RCG/HT-RSI_A4.pdf on Jan. 27, 2011; Copyright 2007.

Document entitled: "CD Dynastore: Overview"; 28 pages; Compact Dynamics; Apr. 29, 2008.

Pending U.S. Patent Application entitled: "Power Equipment Apparatus Having Flywheel Assembly"; Joseph P. W. Whinnery; U.S. Appl. No. 13/079,321, filed Apr. 4, 2011.

Article entitled: "Centre for Advanced Electronically Controlled Drives", 3 pages; Ewan Goodier, University of Leicester, Department of Engineering; retrieved from www.le.ac.uk/engineering/research/groups/power/caecd/6p_pedrg.html on Jul. 31, 2009.

Notice of Allowance and Fee(s) Due in co-pending U.S. Appl. No. 13/079,321; Inventor: Josepeh P.W. Whinnery; Filing Date: Apr. 4, 2011; Titled: Power Equipment Apparatus Having Flywheel Assembly; Dated Mailed: October 22, 2013; in its entirety.

* cited by examiner

FLYWHEEL ASSEMBLIES AND VEHICLES INCLUDING SAME

CROSS-REFERENCE TO RELATED APPLICATIONS

This application claims priority of U.S. Provisional Patent Application Ser. No. 61/292,335, filed Jan. 5, 2010, and hereby incorporates this provisional patent application by reference herein in its entirety.

TECHNICAL FIELD

A flywheel assembly is provided on a vehicle. The flywheel assembly can include a rotatable inertial mass configured to selectively exert moments upon the vehicle.

BACKGROUND

During operation of a vehicle, external forces act upon the vehicle to affect the overall performance and/or comfort of the vehicle. For example, during braking, a pitching force may be exerted on the vehicle which causes the vehicle to dive.

SUMMARY

In accordance with one embodiment, a vehicle comprises a frame, an engine, a steering assembly, a front wheel, a rear wheel, a brake system, a flywheel assembly, and a controller. The frame defines a roll axis. The engine is supported by the frame. The steering assembly, is pivotally coupled with the frame and is pivotable about a steering axis. The front wheel is rotatably coupled with the steering assembly. The rear wheel is rotatably coupled with the frame. The brake system is associated with at least one of the front wheel and the rear wheel and is configured to facilitate selective braking of at least one of the front wheel and the rear wheel. The flywheel assembly comprises at least one inertial mass and is coupled with the frame. Said at least one inertial mass is rotatable about a spin axis. Rotation of each of said at least one inertial mass produces an overall spin vector that extends coaxially with the spin axis. The controller is coupled with the flywheel assembly and is configured to facilitate selective rotation of said at least one inertial mass in order to produce the overall spin vector in anticipation of one of vehicular acceleration and vehicular deceleration.

In accordance with another embodiment, a vehicle comprises a frame, an engine, a steering assembly, a front wheel, a rear wheel, a controller, a brake system, and a flywheel assembly. The frame defines a roll axis. The engine is supported by the frame. The steering assembly is pivotally coupled with the frame and is pivotable about a steering axis. The front wheel is rotatably coupled with the steering assembly. The rear wheel is rotatably coupled with the frame. The brake system is associated with at least one of the front wheel and the rear wheel and is configured to facilitate selective braking of at least one of the front wheel and the rear wheel. The flywheel assembly comprises at least one inertial mass and is coupled with the frame. Said at least one inertial mass is rotatable about a spin axis. Rotation of each of said at least one inertial mass produces one of a positive overall spin vector and a negative overall spin vector each extending coaxially with the spin axis. The controller is coupled with the flywheel assembly and is configured to control rotation of said at least one inertial mass in anticipation of an approaching turn.

In accordance with yet another embodiment, a method for operating a motorcycle is provided. The motorcycle comprises a flywheel assembly having a braking system and at least one inertial mass that is rotatable about a spin axis. The method comprises rotating each of said at least one inertial mass to produce an overall spin vector. The method further comprises controlling each of said at least one inertial mass to produce the overall spin vector in anticipation of one of vehicular deceleration and vehicular acceleration, respectively.

In accordance with yet another embodiment, a method for operating a motorcycle is provided. The motorcycle comprises a flywheel assembly having a braking system and at least one inertial mass that is rotatable about a spin axis. The method comprises rotating each of said at least one inertial mass to produce a positive overall spin vector and a negative overall spin vector. The method further comprises controlling each of said at least one inertial mass to produce the positive overall spin vector and the negative overall spin vector in anticipation of an approaching leftward turn and an approaching rightward turn, respectively.

BRIEF DESCRIPTION OF THE DRAWINGS

Various embodiments will become better understood with regard to the following description, appended claims, and accompanying drawings wherein:

DETAILED DESCRIPTION

Selected embodiments of the present invention are hereinafter described in detail below and/or are shown and/or described in FIGS. 1-9. A vehicle includes a flywheel assembly, as described in further detail below. Examples of suitable vehicles include, for example, a car, a truck, a van, an aircraft, a watercraft, farm equipment, a tractor, construction equipment, and saddle-type vehicles. Saddle-type vehicles include, for example, motorcycles, scooters, bicycles, all terrain vehicles (ATVs), snowmobiles, and personal watercraft.

Figure 1:
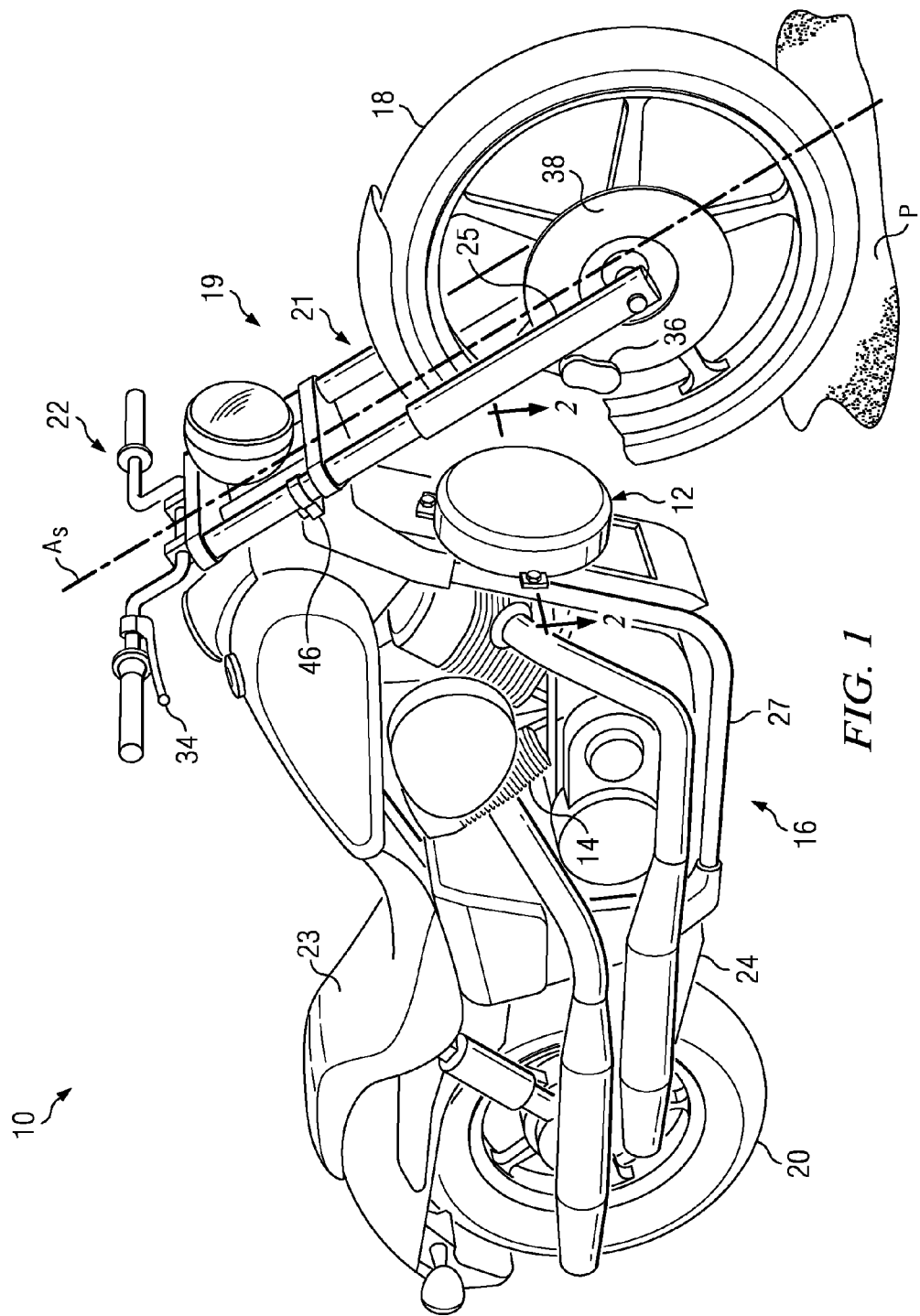
FIG. 1 is a front perspective view depicting a motorcycle having a steering assembly and a flywheel assembly in accordance with one embodiment, wherein a portion of a front wheel is broken away for clarity of illustration.

An example of a motorcycle 10 in accordance with one embodiment is depicted in FIGS. 1-8. The motorcycle 10 is shown in FIG. 1 to include an engine 14. The engine 14 can comprise an internal combustion engine, a turbine-type engine, or any of a variety of other suitable type of engine. The engine 14 can be configured to consume gasoline, diesel fuel, biodiesel, propane, natural gas, ethanol, hydrogen, and/or any of a variety of other suitable fuels or combination thereof. In alternative embodiments, an engine can comprise an electric motor or a pair of mechanical foot pedals, for example.

As shown in FIG. 1, the motorcycle 10 can further include a body or frame 16, a front wheel 18, and a rear wheel 20. The engine 14 can be coupled with the frame 16 of the motorcycle 10 and can be configured to generate mechanical power for transmission to the front and/or rear wheels 18, 20 of the motorcycle 10. The motorcycle 10 can include a steering assembly 19 having a front fork 21 and a pair of handlebars 22 coupled with one another. The steering assembly 19 can be pivotable about a steering axis $A_s$. The front wheel 18 can be rotatably coupled with the front fork 21. The front wheel 18 can be steered through actuation of the handlebars 22 by an operator of the motorcycle 10 whom is seated upon a seat 23 supported by the frame 16 of the motorcycle 10. The front fork 21 can include a cushion member 25 that is configured to absorb shock impacts imparted to the front fork 21 during operation of the motorcycle 10. The rear wheel 20 can be rotatably supported by a swing member 24. It will be appreciated that in one embodiment the frame 16 can comprise the steering assembly 19, the swing member 24, and a main frame 27, but in other embodiments the frame can be any of a variety of suitable alternative frame arrangements that can include both sprung and unsprung frame portions, for example.

The motorcycle 10 can include a brake system that is selectively actuated by a brake handle 34 to facilitate braking of the motorcycle 10. In one embodiment, as illustrated in FIG. 1, the braking system can include a brake caliper 36 and a brake disc 38. The brake disc 38 can be coupled with the front wheel 18. The brake caliper 36 can selectively engage the brake disc 38 through operation of the brake handle to facilitate braking of the motorcycle 10. It will be appreciated that braking of the motorcycle 10 can be achieved through energy recovery (e.g., regenerative braking) or any of a variety of other suitable alternative arrangements.

Figure 2:
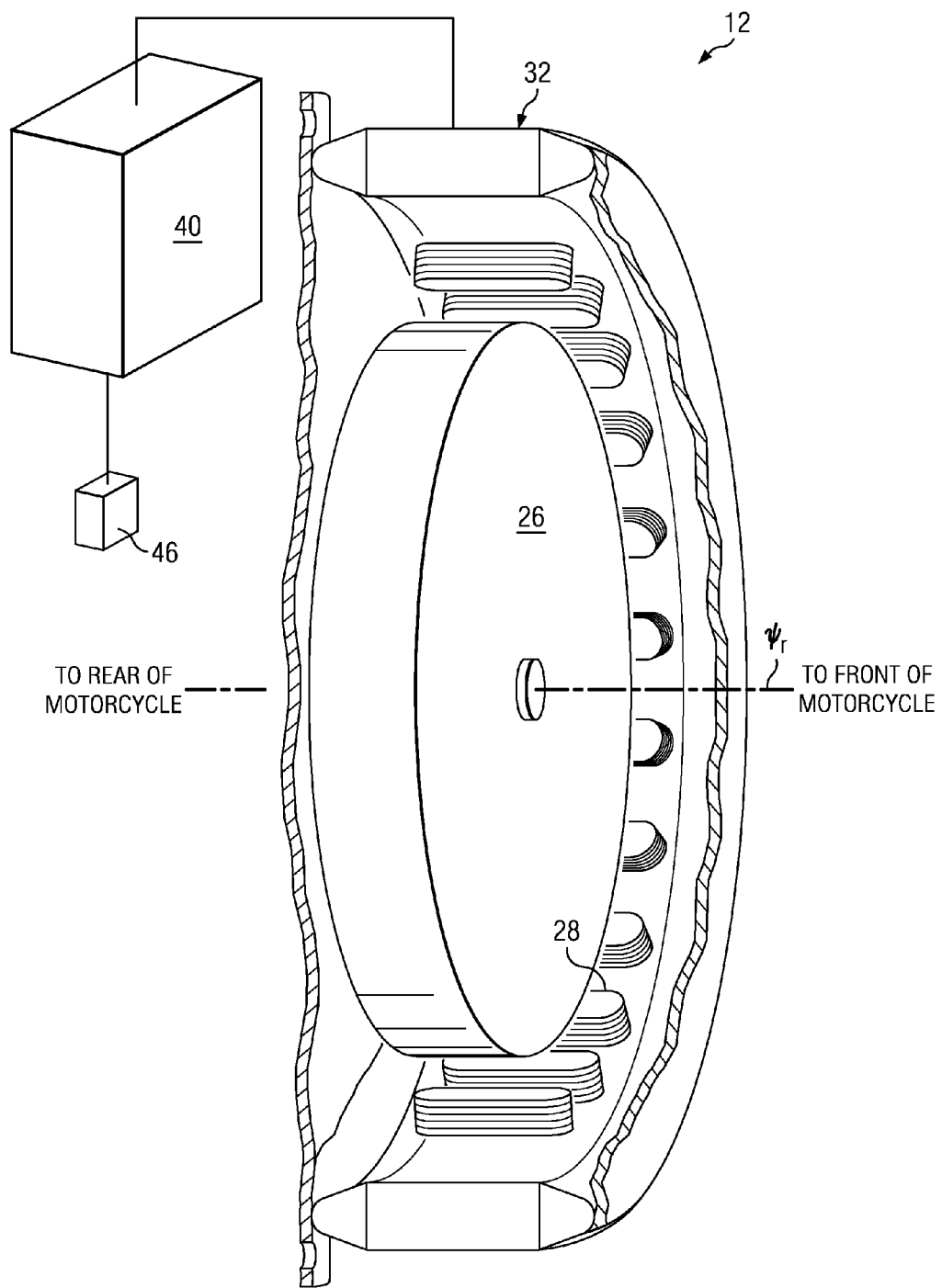
FIG. 2 is a schematic view depicting the flywheel assembly of FIG. 1 taken along section line 2-2 in FIG. 1, and in association with certain other components of the motorcycle of FIG. 1.
Figure 3:
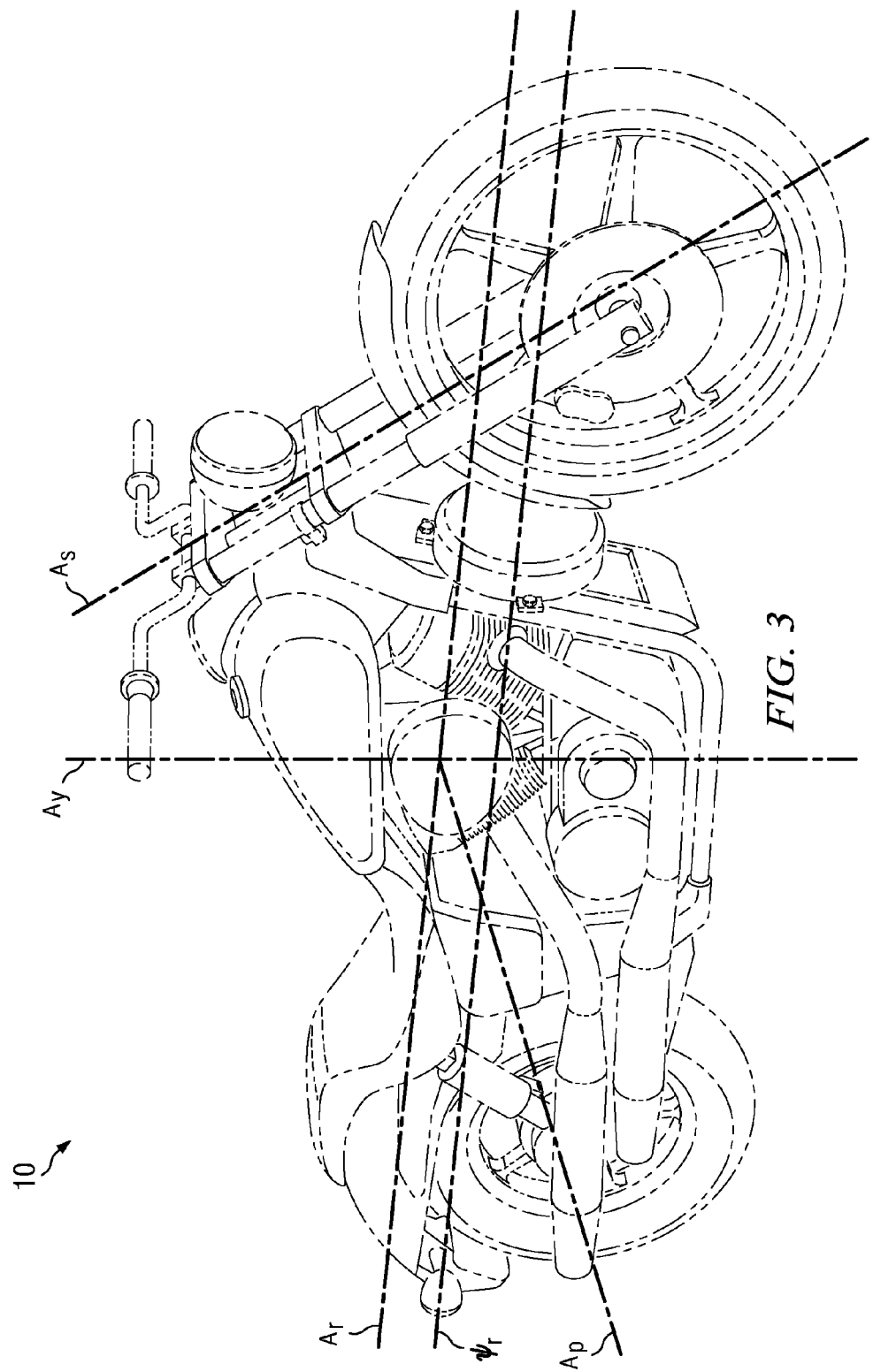
FIG. 3 is a front perspective view depicting the motorcycle of FIG. 1, wherein various axes of the motorcycle are also depicted.

The motorcycle 10 can further include a flywheel assembly 12. As illustrated FIG. 2, the flywheel assembly 12 can include an inertial mass 26 that is configured to rotate about a spin axis $\Psi_r$. As illustrated in FIG. 3, the flywheel assembly 12 can be oriented on the motorcycle 10 such that the spin axis $\Psi_r$ of the inertial mass 26 lies substantially parallel with a roll axis Ar of the motorcycle 10. In such an arrangement, a nutation axis ($\Theta_r$ shown in FIG. 8) of the inertial mass 26 can be substantially coaxial or parallel with a pitch axis $A_p$, and a precession axis ($\Phi_r$ shown in FIG. 8) of the inertial mass 26 can be substantially coaxial or parallel with a yaw axis $A_y$.

The flywheel assembly 12 can be positioned at any of a variety of suitable locations upon the motorcycle 10. For example, in one embodiment as shown generally in FIGS. 1 and 2, the flywheel assembly 12 can be attached to the frame 16 of the motorcycle 10 at a position adjacent to the front wheel 18. In another embodiment, a flywheel assembly can be positioned beneath a seat of a motorcycle. It will be appreciated that the positioning of the flywheel assembly upon a vehicle, such as a motorcycle, can be selected based upon optimization of vehicular space, cost, and weight considerations.

The inertial mass 26 can be configured for selective rotation during operation of the motorcycle 10. In one embodiment, the flywheel assembly 12 can be configured as a flywheel battery (e.g., a flywheel energy storage device) such that the inertial mass 26 is rotated with electrical energy. Typically, a flywheel battery is used to store electrical energy as rotational energy. Therefore, as illustrated in FIG. 2, the flywheel assembly 12 can include a stator 28 associated with the inertial mass 26. The inertial mass 26 can be configured as a rotor such that the inertial mass 26 can electromagnetically interact with the stator 28 in a manner typical of a switched reluctance motor, a conventional brushless DC motor, an AC induction motor, or any manner of synchronous electrical machines familiar in the art.

Rotation of the inertial mass 26 can be a function of stored electrical energy. When electrical energy is imparted to the stator 28 to charge the flywheel assembly 12, the angular velocity of the inertial mass 26 increases. However, when electrical energy is discharged from the flywheel assembly 12 (e.g., an electrical load is coupled to the flywheel assembly 12), the angular velocity of the inertial mass 26 can be decreased.

The inertial mass 26 can be supported within a containment vessel 32. The containment vessel 32 may be a type of vacuum vessel, for example. The containment vessel 32 can be associated with a vacuum pump (not shown) to facilitate creation of a vacuum within the containment vessel 32. Creation of a sufficient vacuum within the containment vessel 32 can facilitate improved efficiency and reduced friction losses during rotation of the inertial mass 26.

As illustrated in FIG. 2, a controller 40 can be associated with the flywheel assembly 12 to facilitate selective rotation of, and control the angular velocity and/or direction of the inertial mass 26. In one embodiment, the controller 40 can comprise an electronic control unit. It will be appreciated, however, that a flywheel assembly can be controlled with any of a variety of suitable alternative controllers or electronic components. The controller 40 can be configured to control the state of charge of the flywheel assembly 12 by controlling the speed of the inertial mass 26. For example, the controller 40 can impart electrical energy to the flywheel assembly 12 to increase the angular velocity of the inertial mass 26. Similarly, the controller 40 can discharge electrical energy from the flywheel assembly 12 (e.g., by introducing an electrical load) to decrease the angular velocity of the inertial mass 26.

Rotation of the inertial mass 26 can produce an overall spin vector that extends coaxially with the spin axis $\Psi_r$ in either direction depending upon the direction of the inertial mass 26. The overall spin vector produced by the inertial mass 26 can exert gyroscopic forces on the motorcycle 10 which can result in the exertion of certain moments on the motorcycle 10 during operation.

Figure 4:
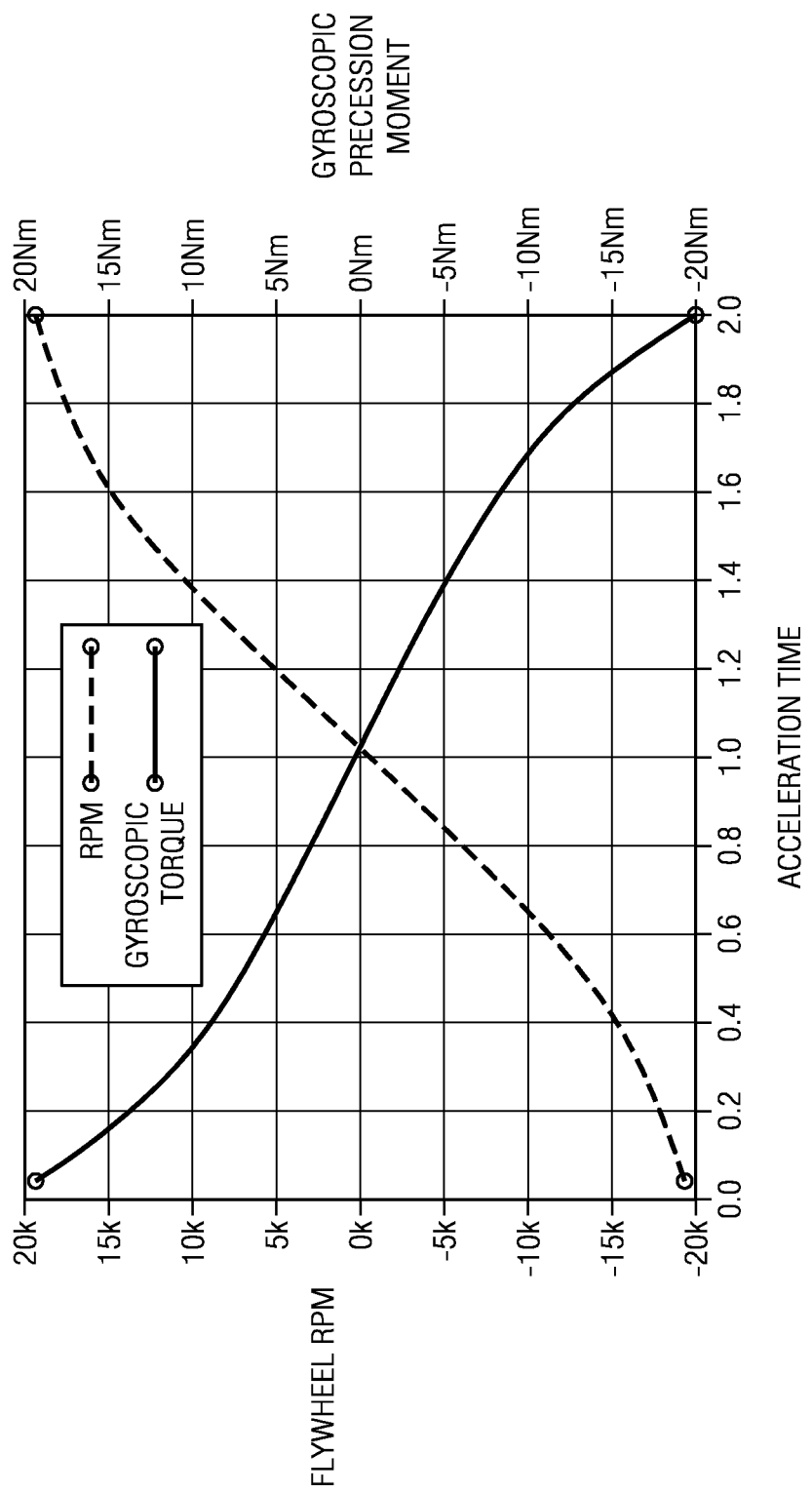
FIG. 4 is a graph depicting the rotational speed and gyroscopic precession moment of the inertial mass over time.
Figure 5A:
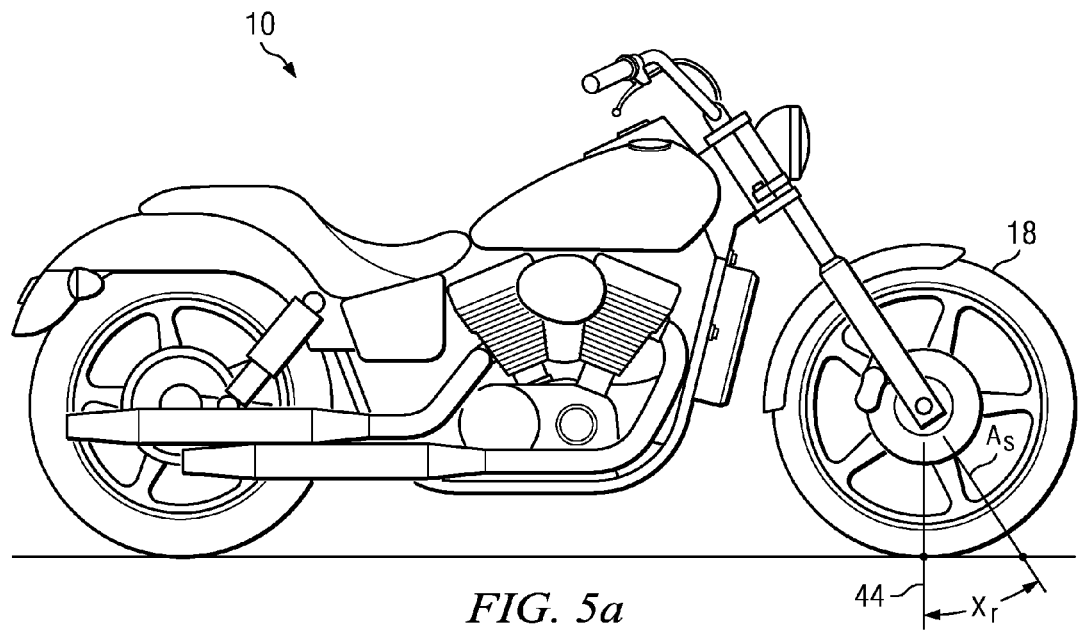
FIG. 5a is a side elevational view depicting the motorcycle of FIG. 1, wherein the motorcycle is engaging in a non-braking operation.
Figure 5B:
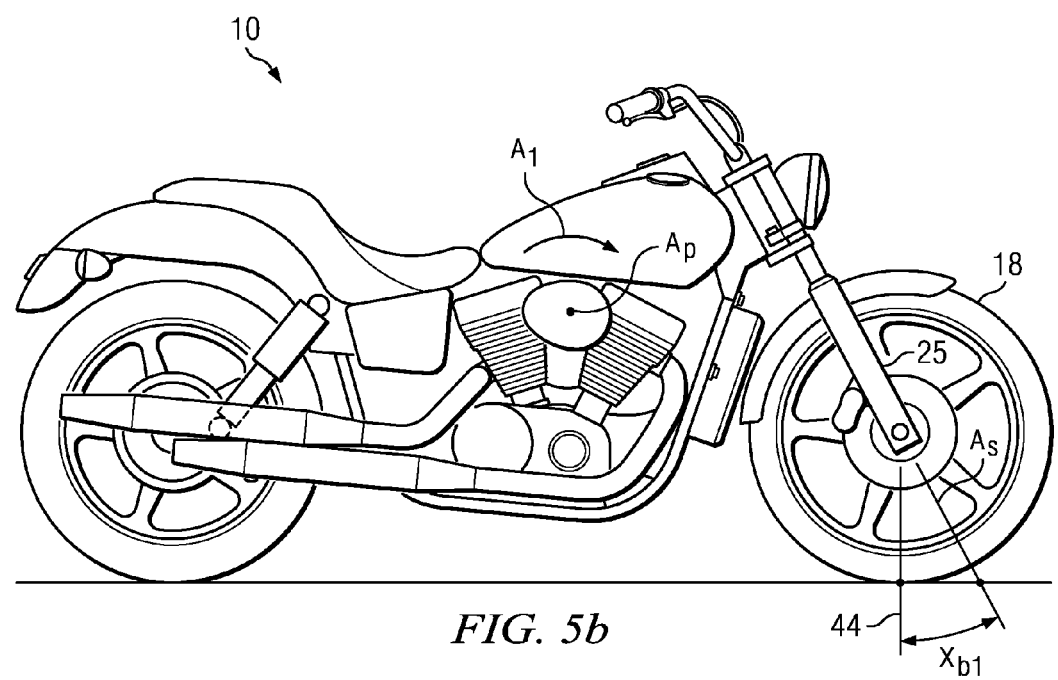
FIG. 5b is a side elevational view depicting the motorcycle of FIG. 1, wherein the motorcycle is engaging in a braking operation (with a pitching moment imparted upon the motorcycle)
Figure 6:
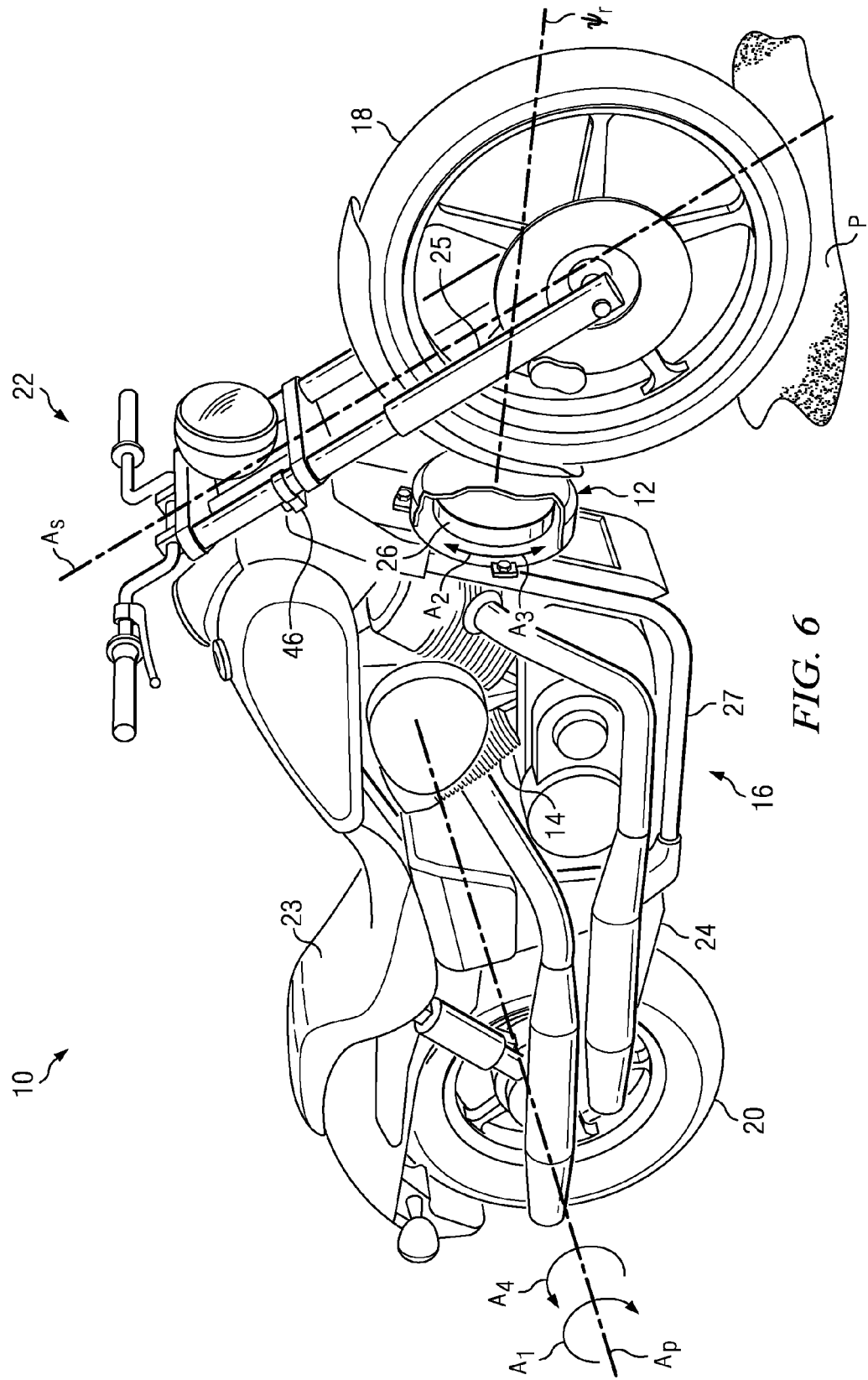
FIG. 6 is a front perspective view depicting the motorcycle of FIG. 1, wherein a portion of the flywheel assembly is cut away to expose the inertial mass.
Figure 7A:
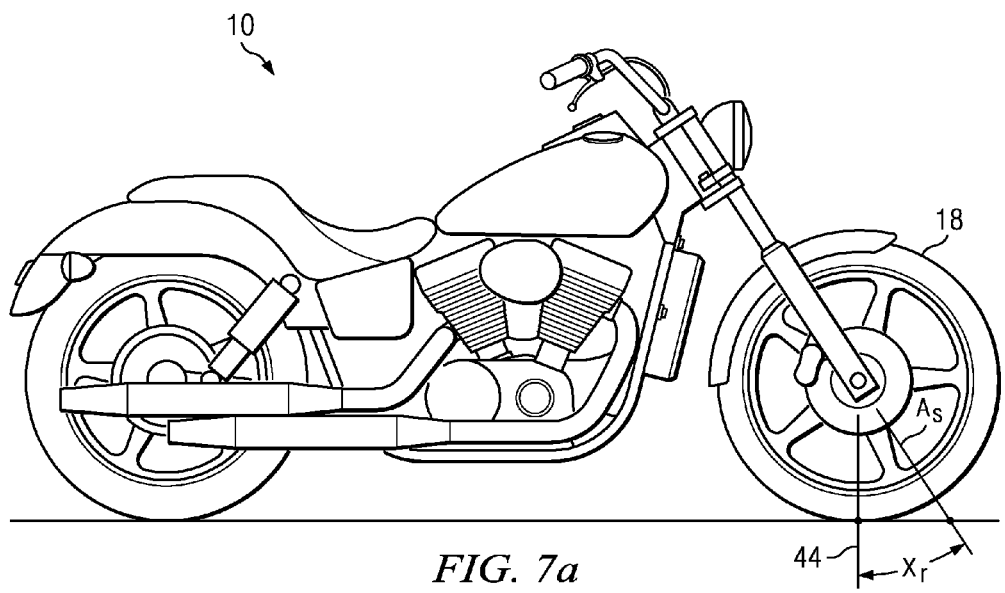
FIG. 7a is a side elevational view depicting the motorcycle of FIG. 1, wherein the motorcycle is engaging in a non-braking operation.
Figure 7B:
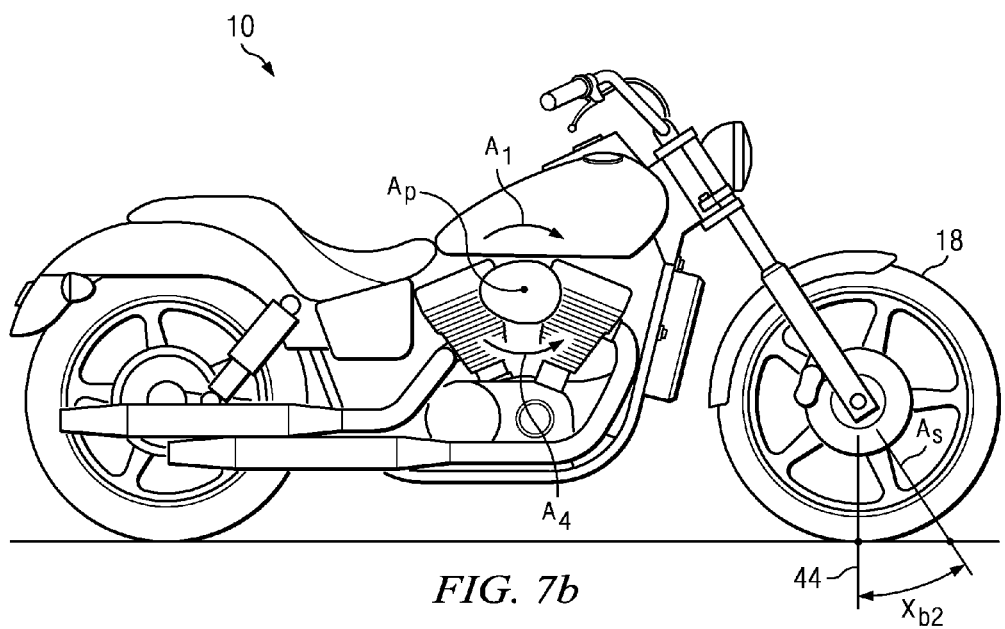
FIG. 7b is a side elevational view depicting the motorcycle of FIG. 1, wherein the motorcycle is engaging in a braking operation (with a pitching moment and a counter-pitching moment imparted upon the motorcycle)

Rotation of the inertial mass 26 can apply a gyroscopic torque that is proportional with the angular velocity of the inertial mass 26. For example, as illustrated in FIG. 4, as the inertial mass 26 rotates between −20,000 R.P.M. and 20,000 R.P.M., the gyroscopic precession moment of the inertial mass 26 can vary between 20 Nm and −20 Nm, respectively. Thus, the angular velocity of the inertial mass 26 can be controlled to apply various gyroscopic torques during operation of the motorcycle 10. The controller 40 can accordingly control the flywheel assembly 12 in order to overcome the effects of certain driving conditions on the motorcycle 10. In one embodiment, during deceleration, such as during braking or when decreasing the throttle, the motorcycle 10 can undergo a pitching moment (e.g., a rotational torque about the pitch axis $A_p$) in the direction $A_1$, as shown in FIG. 5b. In response to this pitching moment, the cushion member 25 can collapse and the front wheel 18 can move closer to the frame 16. For example, the location where the front wheel 18 contacts a roadway (e.g., P in FIG. 1) is shown in FIGS. 5a and 5b as a vertical centerline 44. When the front wheel 18 moves closer to the frame 16, the angle $X_r$ (FIG. 5a) between the steering axis As and the vertical centerline 44 can be reduced to an angle $X_{b1}$ (FIG. 5b) which can reduce the wheelbase of the motorcycle 10. A pitching moment in the direction of $A_1$ can accordingly cause the motorcycle 10 to dive forward (e.g., brake dive) which can affect the overall performance of the motorcycle 10. The controller 40, however, can cause the inertial mass 26 to rotate to counteract the effects of deceleration on the motorcycle 10. For example, as shown in FIG. 6, when the inertial mass 26 is rotating (e.g., either clockwise in the direction of $A_2$ or counterclockwise in the direction of $A_3$, as viewed from in front of the motorcycle 10) during deceleration, the inertial mass 26 can exert a counter-pitching moment in the direction of $A_4$ that opposes the pitching moment in the direction of $A_1$. As illustrated in FIG. 7b, during deceleration, this counter-pitching moment can limit the deviation of the angle $X_r$ and the angle $X_{b2}$ which can accordingly result in improved overall performance of the motorcycle 10 (e.g., limit the rate of change of the steering geometry).

Figure 8:
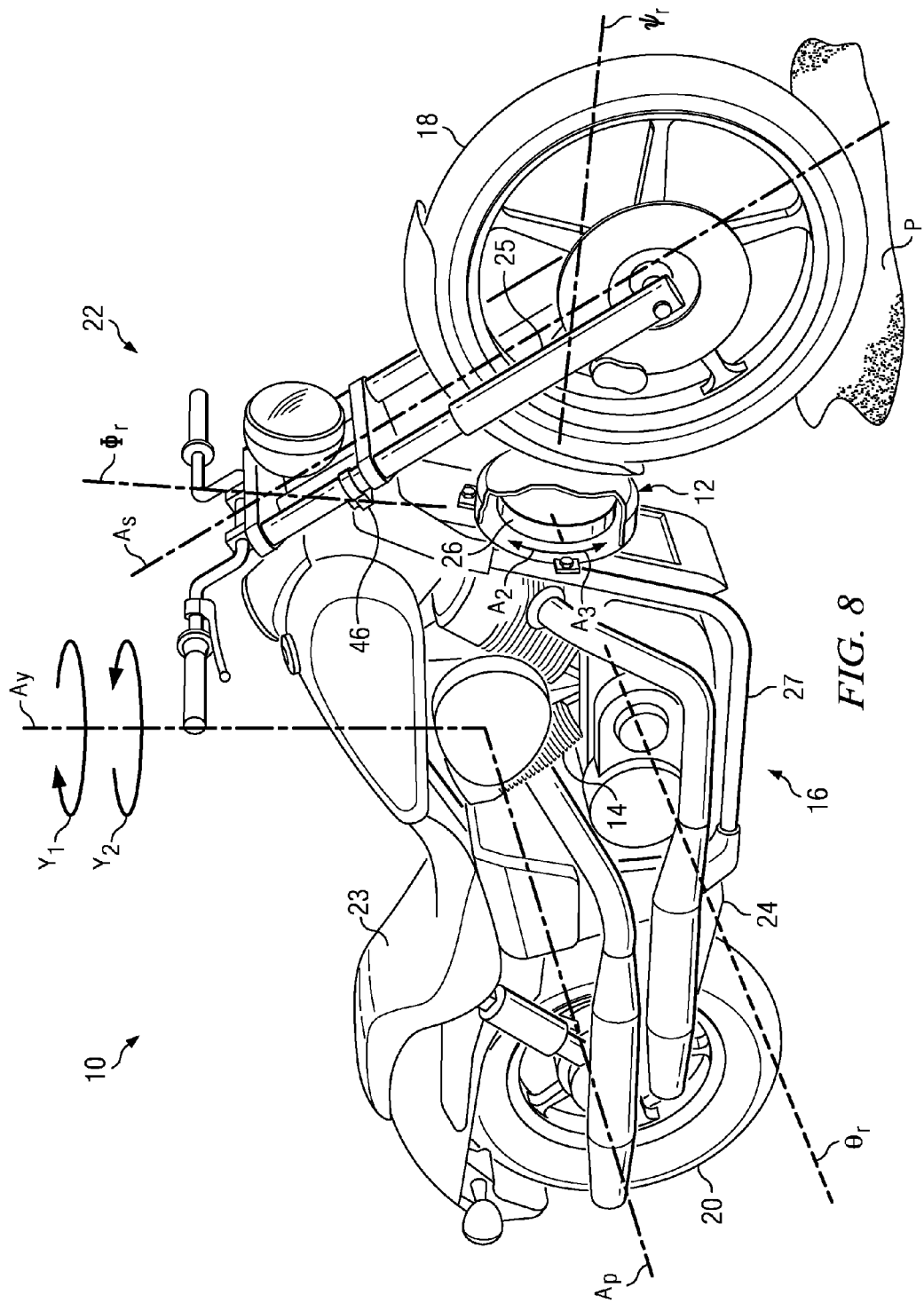
FIG. 8 is a front perspective view depicting the motorcycle of FIG. 6 and further depicting a pair of yaw moments acting upon the motorcycle along a yaw axis.

When the inertial mass 26 exerts a counter-pitching moment on the motorcycle 10, the inertial mass 26 can precess about its precession axis (e.g., $\Phi_r$, shown in FIG. 8). This precession can exert a yaw moment on the motorcycle 10 about the yaw axis $A_y$, in either a clockwise or counter-clockwise direction. The direction of the yaw moment can depend upon the overall spin vector produced by the inertial mass 26. For example, counter-clockwise rotation of the inertial mass 26 (e.g., in the direction of $A_3$) can produce a positive overall spin vector (e.g., an overall spin vector that extends towards a front of the motorcycle 10). Conversely, clockwise rotation of the inertial mass 26 (e.g., in the direction of $A_2$) can produce a negative overall spin vector (e.g., an overall spin vector that extends towards a rear of the motorcycle 10). As illustrated in FIG. 8, if the inertial mass 26 is rotating in a counter-clockwise direction (e.g., to produce a positive overall spin vector) a yaw moment in the direction of $Y_2$ (e.g., in a counter-clockwise direction as viewed from above the motorcycle 10 looking downwardly toward the ground along the yaw axis $A_y$) can be produced upon the motorcycle 10. Conversely, if the inertial mass 26 is rotating in a clockwise direction, a yaw moment in the direction of $Y_1$ (e.g., in a clockwise direction as viewed from above the motorcycle 10 looking downwardly toward the ground along the yaw axis $A_y$) can be produced upon the motorcycle 10. These yaw moments can influence the motorcycle 10 to turn. For example, producing the yaw moment in the direction of $Y_1$ can influence the motorcycle 10 to turn rightwardly. Conversely, producing the yaw moment in the direction of $Y_2$ can influence the motorcycle 10 to turn leftwardly.

The controller 40, therefore, can control the direction of rotation of the inertial mass 26 (e.g., in the direction of $A_2$ or $A_3$) to produce an overall spin vector that imparts a yaw moment that corresponds with an approaching turn. In particular, when the motorcycle 10 decelerates to enter a turn, the resulting yaw moment can improve the overall performance of the motorcycle 10 when going into the turn. For example, if the motorcycle 10 is approaching a left turn, the inertial mass 26 can be rotated counter-clockwise (e.g., in the direction $A_3$) in anticipation of the left turn. When the motorcycle 10 decelerates, the inertial mass 26 exerts the counter-pitching moment in the direction of $A_4$ (FIG. 6) that reduces brake dive and also exerts a yaw moment in the direction of $Y_2$ that influences the motorcycle 10 into the left turn. In another example, if the motorcycle 10 is approaching a right turn, the inertial mass 26 can be rotated clockwise (e.g., in the direction $A_2$) in anticipation of the right turn. When the motorcycle 10 decelerates, the inertial mass 26 can exert a counter-pitching moment in the direction of $A_4$ that reduces brake dive and also exerts a yaw moment in the direction of $Y_1$ that influences the motorcycle 10 into the right turn. Thus, it may be appreciated that, as the motorcycle 10 decelerates, the inertial mass 26 can exert a counter-pitching moment and yaw moment that improves the overall performance and handling of the motorcycle 10 into the turn.

In one embodiment, the controller 40 can be associated with power electronics (not shown) that facilitate control of the direction of rotation of the inertial mass 26. In particular, the power electronics can be configured to apply opposing electrical energy fields to the flywheel assembly 12 to change the direction of the inertial mass 26. It will be appreciated that the power electronics can also be configured to decelerate the inertial mass 26 (e.g., through electronic braking) prior to changing its rotational direction. When the controller 40 initiates a change in the direction of the inertial mass 26, the power electronics can decelerate the inertial mass 26 to rest and can then apply an electrical energy field that rotates the inertial mass 26 in an opposite direction. In this configuration, deceleration corresponds to a generator mode whereby mechanical energy is converted to electrical energy.

Figure 9:
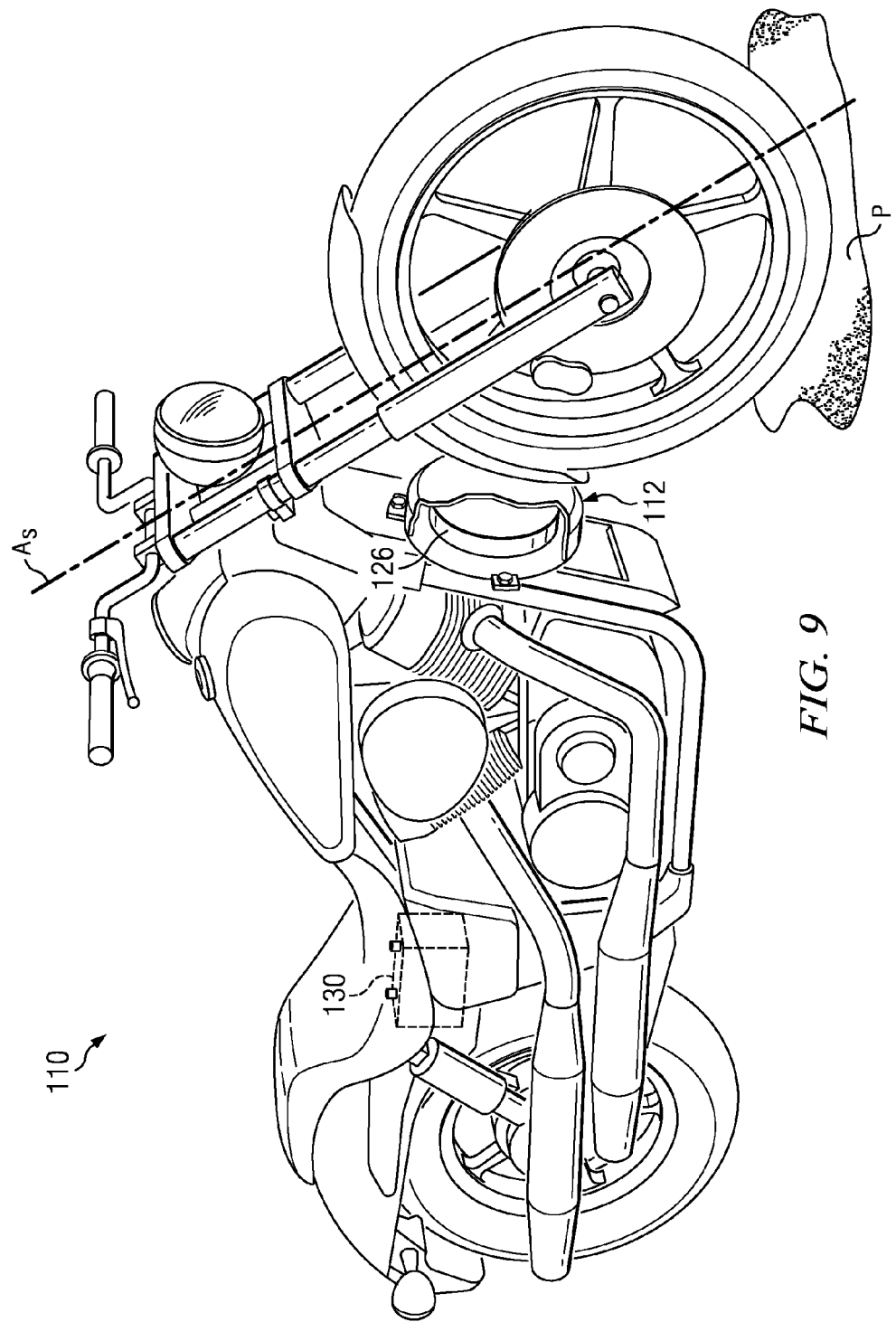
FIG. 9 is a front perspective view depicting a motorcycle having a steering assembly and a flywheel assembly in accordance with another embodiment, wherein a portion of the flywheel assembly is cut away.

In one embodiment, the flywheel assembly 12 can be powered from the motorcycle's electrical system. During operation of the flywheel assembly 12, the battery of the motorcycle 10 can be charged and discharged in order to vary the rotation of the inertial mass 26. Such operation of the flywheel assembly 12 using the motorcycle's battery can overburden the battery which can reduce the useful life of the battery and can affect the overall performance of the motorcycle's electrical system. Thus, in an alternative embodiment, as illustrated in FIG. 9, a motorcycle 110 can include a flywheel assembly 112 that can be coupled with an energy storage device 130. The energy storage device 130 can be configured to exchange electrical energy with the flywheel assembly 112. For example, to increase the angular velocity of an inertial mass 126 within the flywheel assembly 112, electrical energy can be discharged from the energy storage device 130 and provided to the flywheel assembly 112. To decrease the angular velocity of the inertial mass 126, electrical energy can be discharged from the flywheel assembly 112 and provided to charge the energy storage device 130. It will be appreciated that transferring energy between the flywheel assembly 112 and the energy storage device 130 can reduce the electrical burden placed on the motorcycle's electrical system, thereby improving the longevity of the on-board battery and the overall performance of the motorcycle's electrical system.

It will be appreciated that the energy storage device 130 can comprise any of a variety of suitable power sources such as, for example, a battery, a capacitor, a fuel cell, a hydraulic or pneumatic pressure source, or another mechanical energy storage device. The type of energy storage device can be selected based upon size, weight, energy storage capacity, efficiency, and other factors. In one embodiment, the energy storage device 130 can include a flywheel battery. In such an embodiment, the positioning of the energy storage device upon a vehicle, such as a motorcycle, can be selected such that its gyroscopic effects do not adversely affect, or perhaps even positively affect, handling and other performance characteristics of the vehicle.

It will also be appreciated that the flywheel assembly 112 and the energy storage device 130 can be coupled with others features of a motorcycle's electrical system. For example, in one embodiment, the electrical system can provide initialization power to charge the flywheel assembly 112 and energy storage device 130 when the motorcycle 110 is initially operated after a period of rest. In such an embodiment, once the flywheel assembly 112 and energy storage device 130 are charged, they can operate with only minimal electrical energy being provided from the motorcycle's electrical system to accommodate for losses in the flywheel assembly 112 and energy storage device 130 (e.g., due to friction and impedance loss).

It will be appreciated that when the flywheel assembly 12 includes only one inertial mass (e.g., 26 as shown in FIG. 8), the direction of the overall spin vector produced is merely a function of the direction of rotation of the inertial mass 26. For example, rotation of the inertial mass 26 in a clockwise direction (e.g., $A_2$) produces a negative overall spin vector and rotation of the inertial mass 26 in a counter-clockwise direction (e.g., $A_3$) can produce a positive overall spin vector. It will be appreciated, however, that multiple rotatable inertial masses similar to rotatable inertial mass 26 can be implemented co-axially or otherwise parallel to provide redundancy of operation. When multiple rotating inertial masses act on a system, the sum of all of the individual gyroscopic moments produce a resultant moment on the entire system. Therefore, when multiple rotating masses of appreciable inertia are included in an embodiment, the controller 40 can be configured to operate on each mass to produce the desired resultant moments.

In one embodiment, a flywheel assembly can include first and second inertial masses which can rotate about a common spin axis (e.g., similar to spin axis $\Psi_r$ shown in FIG. 2). The first and second inertial masses can rotate in opposite directions (e.g., counterclockwise and clockwise). The sum of the spin vectors of each of the first and second inertial masses can produce an overall spin vector that accordingly exerts gyroscopic forces on the motorcycle 10. For example, if the first and second inertial masses are rotated in different directions at the same angular velocity, the overall spin vector from the first and second inertial masses is zero and no net effect gyroscopic force is exerted on the motorcycle 10. However, if the first and second inertial masses are rotated in different directions at different angular velocities, the overall spin vector will be positive or negative (depending upon which inertial mass is rotating faster) which can impart gyroscopic forces on the motorcycle 10 as explained above. It will be appreciated that operation of the first and second inertial masses can be achieved similar to the operation of the inertial mass 26 described above and shown in FIG. 2.

It will be appreciated that the magnitude of the counter-pitching moment and/or yaw moment exerted by the inertial mass 26 can be a function of the angular velocity of the inertial mass 26. Therefore, the controller 40 can be configured to tailor the angular velocity the inertial mass 26 to exert a counter-pitching moment (e.g., in the direction of $A_4$) that is sufficient to oppose brake dive. The controller 40 can also be configured to tailor the angular velocity of the inertial mass 26 to exert a yaw moment that is appropriate to compensate for the severity of an approaching turn (e.g., a radius of the approaching turn, approach speed of the motorcycle into the approaching turn, and/or road conditions), or optimized for a series of approaching turns.

During operation of the motorcycle 10, the controller 40 can tailor operation of the inertial mass 26 to the path of the motorcycle 10. For example, as the motorcycle 10 approaches different turns, the controller 40 can cause the inertial mass 26 to rotate in the appropriate direction and at the appropriate angular velocity to produce a resultant spin vector upon the motorcycle 10 that can accommodate for any brake dive as well as the severity of the approaching turn. If the brakes are applied in order to navigate the turn, the motorcycle 10 can be influenced into the turn by the resulting yaw moment. In one embodiment, the path of the motorcycle 10 can be predetermined such as when the motorcycle 10 is operated on a racetrack. In such an embodiment, the controller 40 can be loaded with predefined control directives for the inertial mass 26 that correspond with the path of the motorcycle 10. However, in another embodiment, the path of the motorcycle 10 can be unspecified. In such an embodiment, the controller 40 can be configured to predict the path of the motorcycle 10 such as with a global position system or other suitable predictive means. The motorcycle 10 can include any of a variety of suitable sensors or other detection equipment that can facilitate detection of deceleration, of acceleration, of steering, and/or of the approaching path for the motorcycle 10. In one embodiment, the motorcycle 10 can include an inertial measurement unit (IMU) that is configured to detect angular velocity and linear acceleration of the motorcycle 10. In another embodiment, the motorcycle 10 can include a lean angle sensor and a vehicular speed sensor. The lean angle sensor can facilitate detection of the lean angle of the motorcycle 10 relative to a ground surface, such as when the motorcycle is leaning to navigate a turn. The vehicular speed sensor can facilitate detection of the operating speed of the motorcycle 10.

It will be appreciated that the controller 40 can control the flywheel assembly 12 in order to overcome the effects of acceleration, such as when increasing the throttle of the motorcycle 10. In one embodiment, during acceleration, the motorcycle 10 can undergo a pitching moment in the direction $A_4$, (e.g., as shown in FIG. 5b). In response to this pitching moment, the cushion member 25 can extend and the front wheel 18 can move away from the frame 16. A pitching moment in the direction of $A_4$ might cause the front of the motorcycle 10 to lift which can affect the overall performance of the motorcycle 10. The controller 40, however, can cause the inertial mass 26 to rotate to counteract the effects of acceleration on the motorcycle 10. For example, when the inertial mass 26 is rotating during acceleration, the inertial mass 26 can exert a counter-pitching moment in the direction of $A_1$ that opposes the pitching moment in the direction of $A_4$. During acceleration, this counter-pitching moment can limit lifting of the front of the motorcycle 10 which can provide a more constant horizontal orientation of the motorcycle 10 and can promote more consistent steering geometry and/or wheel base which can result in improved overall performance of the motorcycle 10.

After navigating a turn, the motorcycle 10 can accelerate to exit the turn (e.g., in anticipation of entering a straightaway). The controller 40, therefore, can control the direction of rotation of the inertial mass 26 (e.g., in the direction of $A_2$ or $A_3$) to counteract the effects of acceleration of the motorcycle 10 as well as impart a yaw moment upon the motorcycle 10 that facilitates more effective turning of the motorcycle 10 when exiting the turn which can improve the overall performance of the motorcycle 10. For example, if the motorcycle 10 is exiting a left turn the motorcycle 10 will need to continue to turn slightly leftwardly when exiting the turn. The inertial mass 26 can accordingly be rotated in the counter-clockwise direction $A_3$ in anticipation of exiting the left turn. Once the motorcycle 10 begins to accelerate, the inertial mass 26 exerts a counter-pitching moment in the direction of $A_1$ (FIG. 6) that reduces lifting of the front of the motorcycle 10 and also exerts a yaw moment in the direction of $Y_2$ that influences the motorcycle 10 leftwardly out of the left turn. In another example, if the motorcycle 10 is exiting a right turn the motorcycle 10 will need to continue to turn slightly rightwardly when exiting the turn. The inertial mass 26 can accordingly be rotated in the clockwise direction $A_2$ in anticipation of exiting the right turn. Once the motorcycle 10 begins to accelerate, the inertial mass 26 exerts a counter-pitching moment in the direction of $A_1$ (FIG. 6) that reduces lifting of the front of the motorcycle 10 and also exerts a yaw moment in the direction of $Y_1$ that influences the motorcycle 10 rightwardly out of the right turn. Thus, it may be appreciated that, as the motorcycle 10 accelerates, the inertial mass 26 can exert a counter-pitching moment and yaw moment that improves the overall performance and handling of the motorcycle 10 out of the turn. It will also be appreciated that once the motorcycle 10 has completed the turn, the controller 40 can inhibit rotation of the inertial mass 26 to produce an overall spin vector of zero and thus limit the gyroscopic torque imparted on the motorcycle 10 from the flywheel assembly 12.

When navigating a turn, the motorcycle 10 typically decelerates to enter then turn and then accelerates to exit the turn. The controller 40, therefore, can control the direction of the overall spin vector to accommodate each of the deceleration and acceleration of the motorcycle 10 when navigating a turn. For example, if the motorcycle 10 is approaching a left hand turn, the controller 40 can initially rotate the inertial mass 26 in a counter-clockwise direction to produce a positive overall spin vector. When the motorcycle 10 decelerates to enter the left turn, a yaw moment is produced in the direction of $Y_2$ that influences the motorcycle 10 into the left turn. Once the motorcycle 10 enters the left turn, the controller 40 can then reverse the rotation of the inertial mass 26 (e.g., in a clockwise direction) in anticipation of the motorcycle 10 exiting the left turn. When the motorcycle 10 accelerates to exit the turn, a yaw moment is again produced in the direction of $Y_2$ that influences the motorcycle 10 leftwardly and out of the left turn. A more consistent yaw moment can thus be imparted to the motorcycle 10 during turning irrespective of vehicular acceleration or vehicular deceleration.

It will be appreciated that if the inertial mass 26 is rotating and before any pitching moment is exerted on the motorcycle 10 (e.g., due to braking), the yaw moment may be negligible. Therefore, the inertial mass 26 can be rotating in anticipation of an approaching turn while the motorcycle 10 is operating in a straight direction. Similarly, the inertial mass 26 can be rotating in anticipation of exiting a turn while the motorcycle 10 is currently navigating the turn. In an alternative embodiment, however, when the motorcycle 10 is operating on a straight roadway, the inertial mass 26 can be held at rest until an approaching turn is determined to be within a predefined distance from the motorcycle.

It will also be appreciated that, in some instances, when the motorcycle accelerates or decelerates during rotation of the inertial mass 26, the yaw moment can cause the motorcycle 10 to turn prematurely. For example, the motorcycle 10 can be braked in preparation of an approaching turn but before it becomes necessary to steer the motorcycle 10. Thus, application of a yaw moment once the brakes are applied may cause the motorcycle 10 to turn too early. In one embodiment, therefore, as illustrated in FIGS. 1 and 6, the motorcycle 10 can include a steering damper 46. The steering damper 46 can be coupled with the front fork 21 and the frame 16 of the motorcycle 10. The steering damper 46 can be configured to selectively limit steering of the steering assembly 19. For example, if the motorcycle 10 is operating at a high rate of speed, the steering damper 46 can be configured to limit sudden turning of the handlebars 22. In one embodiment, the steering damper 46 can be an electric steering damper that is associated with the controller 40 (see FIG. 2). The controller 40 can operate the steering damper 46 in conjunction with the inertial mass 26. In particular, the steering damper 46 can restrict sudden pivoting of the steering assembly 19 when turning of the motorcycle 10 might be improper such as when the motorcycle 10 is rapidly decelerating during operation at high speeds (e.g., braking on a straightaway). The controller 40 can reduce dampening of the steering assembly 19 with the steering damper 46 once turning of the motorcycle 10 is proper (e.g., at lower speeds). The dampening magnitude of the electronic steering damper can be controlled to facilitate effective turning of the motorcycle 10. For example, when the motorcycle 10 is braked in anticipation of an upcoming turn, the electronic steering damper can apply a high dampening force. Once the motorcycle 10 begins to enter the turn, the electronic steering damper can apply a lower dampening force to allow less inhibited pivoting of the steering assembly 19.

Since the flywheel assembly 12 can be configured as a flywheel battery, as described above, it will be appreciated that in some embodiments the flywheel assembly 12 can be configured to provide supplemental electrical energy storage for the motorcycle 10. For example, in one embodiment, the flywheel assembly 12 can be a backup energy storage source for the motorcycle's on-board battery. In such an embodiment, the flywheel assembly 12 can be fully charged (e.g., from the energy storage device 130) prior to shutting down the motorcycle 10. If the on-board battery is discharged during shutdown (e.g., by leaving a headlamp on), the flywheel assembly 12 can provide the electrical energy necessary to start the motorcycle 10 in lieu of the on-board battery.

It will be appreciated that a vehicle can include any of a variety of sensors configured to detect external forces such as, for example, a laser ring gyro (e.g., for roll detection), accelerometers, steering angle sensors, throttle position sensors, wheel speed sensors, ultrasonic or radar type ranging sensors, a brake sensor (e.g., for applied braking force detection). The controller 40 can be associated with these sensors to facilitate its control of the flywheel assembly 12.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art.

What is claimed is:

1. A vehicle comprising:
  a frame defining a roll axis;
  an engine supported by the frame;
  a steering assembly pivotally coupled with the frame and pivotable about a steering axis;
  a front wheel rotatably coupled with the steering assembly;

a rear wheel rotatably coupled with the frame;

a brake system associated with at least one of the front wheel and the rear wheel and configured to facilitate selective braking of at least one of the front wheel and the rear wheel;

a flywheel assembly comprising at least one inertial mass and being coupled with the frame, said at least one inertial mass being rotatable about a spin axis, wherein rotation of each of said at least one inertial mass produces an overall spin vector that extends coaxially with the spin axis; and a controller coupled with the flywheel assembly and configured to facilitate selective rotation of said at least one inertial mass in order to produce the overall spin vector in anticipation of one of vehicular acceleration and vehicular deceleration, in a direction that facilitates exertion of a counter-pitching moment on the vehicle in opposition of a pitching moment imparted on the vehicle as a result of said one of vehicular acceleration and vehicular deceleration;

wherein the flywheel assembly is attached to a front of the frame at a position between the frame and the front wheel, said at least one inertial mass arranged such that the spin axis lies in a plane, and the plane intersects the roll axis and is declined toward a front of the vehicle.

2. The vehicle of claim 1 wherein the vehicular deceleration is facilitated by a braking operation.

3. The vehicle of claim 1 wherein the overall spin vector comprises one of a negative overall spin vector and a positive overall spin vector.

4. The vehicle of claim 3 wherein said at least one inertial mass comprises only one inertial mass that is rotatable in one of a clockwise direction and a counterclockwise direction to produce the negative overall spin vector and the positive overall spin vector, respectively.

5. The vehicle of claim 3 wherein the controller is configured to facilitate selective rotation of each of said at least one inertial mass to produce the positive overall spin vector and the negative overall spin vector in anticipation of an approaching leftward turn and an approaching rightward turn, respectively.

6. The vehicle of claim 3 wherein the controller is configured to facilitate selective rotation of each of said at least one inertial mass to produce the negative overall spin vector and the positive overall spin vector in anticipation of exiting a leftward turn and a rightward turn, respectively.

7. The vehicle of claim 3
the controller is further configured to control rotation of said at least one inertial mass in anticipation of an approaching turn; and
the controller is further configured to produce one of the positive overall spin vector and the negative overall spin vector based upon the direction of the approaching turn.

8. The vehicle of claim 7 wherein the controller is configured to facilitate selective rotation of each of said at least one inertial mass to produce the positive overall spin vector and the negative overall spin vector in anticipation of one of an approaching leftward turn and an approaching rightward turn, respectively.

9. The vehicle of claim 8 wherein the controller is configured to produce the negative overall spin vector and the positive overall spin vector in anticipation of exiting the rightward turn and the leftward turn, respectively.

10. The vehicle of claim 8 wherein the controller is configured to control an angular velocity of each of said at least one inertial mass according to the severity of one of the approaching leftward turn and the approaching rightward turn.

11. The vehicle of claim 8 further comprising an electronic steering damper coupled with the frame and the steering assembly, the electronic steering damper being in communication with the controller, wherein the controller is configured to operate the electronic steering damper in anticipation of one of the approaching leftward turn and the approaching rightward turn.

12. The vehicle of claim 11 wherein the controller is configured to increase a dampening force applied by the electronic steering damper in anticipation of one of the approaching leftward turn and the approaching rightward turn.

13. The vehicle of claim 1 wherein the controller is configured to facilitate rotation of said at least one inertial mass to produce a zero overall spin vector.

14. The vehicle of claim 1 wherein the controller is configured to control a magnitude of the overall spin vector by controlling an angular velocity of each of said at least one inertial mass.

15. The vehicle of claim 14 wherein the angular velocity of each of said at least one inertial mass is controlled according to a severity of one of an approaching leftward turn and an approaching rightward turn.

16. The vehicle of claim 1 further comprising a steering damper coupled with the frame and the steering assembly, the steering damper being configured to selectively dampen pivoting of the steering assembly.

17. The vehicle of claim 16 wherein the steering damper comprises an electronic steering damper in communication with the controller and wherein the controller is configured to operate the steering damper in conjunction with rotation of said at least one inertial mass.

18. The vehicle of claim 1 comprising a motorcycle.

19. A method for operating a motorcycle, the motorcycle comprising a frame, a front wheel, a braking system and a flywheel assembly, the flywheel assembly having at least one inertial mass that is rotatable about a spin axis, the method comprising:
providing a flywheel assembly along a front of the frame at a position between the frame and the front wheel, said at least one inertial mass being arranged such that the spin axis lies in a plane, and the plane intersects a roll axis of the motorcycle and is declined toward a front of the motorcycle;
rotating each of said at least one inertial mass to produce an overall spin vector;
controlling each of said at least one inertial mass to produce the overall spin vector in anticipation of one of vehicular deceleration and vehicular acceleration, respectively; and
controlling a direction of the spin vector to facilitate exertion of a counter-pitching moment on the vehicle in opposition of a pitching moment imparted on the vehicle as a result of said one of vehicular acceleration and vehicular deceleration.

20. The method of claim 19 further comprising operating an electronic steering damper in conjunction with rotation of said at least one inertial mass.

21. The method of claim 19 wherein the overall spin vector comprises one of a negative overall spin vector and a positive overall spin vector, the method further comprising
controlling each of said at least one inertial mass to produce the positive overall spin vector and the negative overall spin vector in anticipation of an approaching leftward turn and an approaching rightward turn, respectively, and based upon a direction of the approaching turn.

22. The method of claim 21 further comprising controlling an angular velocity of each of said at least one inertial mass in anticipation of one of the approaching leftward turn and the approaching rightward turn.

\* \* \* \* \*

UNITED STATES PATENT AND TRADEMARK OFFICE
CERTIFICATE OF CORRECTION

PATENT NO. : 8,640,809 B2  
APPLICATION NO. : 12/984167  
DATED : February 4, 2014  
INVENTOR(S) : Joseph P. W. Whinnery Page 1 of 1

It is certified that error appears in the above-identified patent and that said Letters Patent is hereby corrected as shown below:

In the Claims

Claim 1, column 11, line 23 change "mass arranged" to --mass is arranged--.

Signed and Sealed this  
Twenty-seventh Day of May, 2014

Michelle K. Lee  
*Deputy Director of the United States Patent and Trademark Office*